(12) United States Patent
Kerns

(10) Patent No.: US 8,667,931 B2
(45) Date of Patent: Mar. 11, 2014

(54) CONTROL METHOD FOR A VEHICLE AIR INTAKE SYSTEM

(75) Inventor: James Michael Kerns, Trenton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 339 days.

(21) Appl. No.: 13/205,907

(22) Filed: Aug. 9, 2011

(65) Prior Publication Data

US 2013/0036991 A1 Feb. 14, 2013

(51) Int. Cl.
*F01P 3/12* (2006.01)
(52) U.S. Cl.
USPC ..................................... 123/41.05; 180/68.1
(58) Field of Classification Search
USPC ............................ 123/41.04–41.06; 180/68.1
See application file for complete search history.

(56) References Cited

U.S. PATENT DOCUMENTS

| | | | |
|---|---|---|---|
| 4,539,943 A * | 9/1985 | Tsuchikawa et al. | 123/41.05 |
| 4,546,742 A * | 10/1985 | Sturges | 123/41.05 |
| 4,779,577 A * | 10/1988 | Ritter et al. | 123/41.05 |
| 5,490,572 A * | 2/1996 | Tajiri et al. | 180/68.2 |
| 7,334,654 B2 | 2/2008 | Sasano et al. | |
| 7,644,793 B2 * | 1/2010 | Iwasaki et al. | 180/68.1 |
| 7,757,643 B2 | 7/2010 | Harich et al. | |
| 7,766,111 B2 | 8/2010 | Guilfoyle et al. | |
| 7,784,576 B2 | 8/2010 | Guilfoyle et al. | |
| 8,256,387 B2 * | 9/2012 | Taylor | 123/41.05 |
| 2008/0073920 A1 | 3/2008 | Knauer | |
| 2010/0083917 A1 | 4/2010 | Saida et al. | |
| 2011/0005851 A1 | 1/2011 | Doroghazi et al. | |

FOREIGN PATENT DOCUMENTS

| | | |
|---|---|---|
| EP | 0117775 | 9/1984 |
| EP | 1417109 | 4/2008 |

OTHER PUBLICATIONS

S. Charnesky et al., Variable and Fixed Airflow for Vehicle Cooling, SAE International, 2011-01-1340,Apr. 12, 2011.
A. E. El-Sharkawy et al., Evaluation of Impact of Active Grille Shutter on Vehicle Thermal Management, SAE International, 2011-01-1172, Apr. 12, 2011.

* cited by examiner

*Primary Examiner* — Noah Kamen
(74) *Attorney, Agent, or Firm* — Damian Porcari; Brooks Kushman P.C.

(57) ABSTRACT

A method of controlling a vehicle engine compartment cooling system by cooperatively controlling both a variable grille opening and engine cooling fan based on a number of vehicle inputs. Maximum component cooling demand, vehicle speed, and ambient temperature are inputs to lookup tables that issue grille opening demand and engine cooling fan demand. Additionally, vehicle overall power consumption is considered in the development of the lookup tables. A vehicle computing unit selects grille opening settings and cooling fan speeds that correspond to demands from lookup tables. A control signal is sent to an adjustable grille actuator and to a fan motor. Further, vehicle deceleration events are used to trigger a full open grille opening setting, allowing increased cooling at little or no loss to vehicle efficiency. A benefit of the disclosed method is optimal settings to minimize the grille opening for aerodynamic performance while providing required engine component cooling.

12 Claims, 5 Drawing Sheets

CONTROL METHOD FOR A VEHICLE AIR INTAKE SYSTEM

TECHNICAL FIELD

The invention relates to a system to control air flow into a vehicle engine compartment.

BACKGROUND

Vehicle engine components are cooled by air flow during vehicular motion. Some components require specific temperature ranges for effective operation. This is often achieved through air intake openings, or grille openings, in the front end of the vehicle. Grille openings allow air into the engine compartment for component cooling, but increase the overall aerodynamic drag friction of the vehicle, and may reduce fuel efficiency.

Engine component cooling systems have proposed variable grille openings to reduce aerodynamic drag. These control methods employ sequential checks of individual components to determine if the temperature of one or more of the components exceeds a threshold value. There is a need for an air intake control method that maximizes efficiency of vehicle power consumption for a complete range of vehicle operating conditions.

SUMMARY

It is desirable to have a vehicle front end opening that is adjustable to variably control the amount of air allowed to enter the engine compartment for cooling. Vehicle conditions where aerodynamic drag friction effects are low may take advantage of larger air intake openings, and increased cooling. At higher speeds, aerodynamic drag friction effects are increased. When this occurs, the smallest air intake opening that provides adequate cooling is desired. According to one aspect of this disclosure, the extent of opening of a variable front end grille opening is controlled in response to a number of component cooling requirements and vehicle operating conditions. This solves the problem of providing optimal balance between aerodynamic effects, required air cooling, and vehicle power consumption.

Another aspect of this disclosure is that a plurality of engine components are monitored simultaneously to determine both a grille opening setting and an engine cooling fan speed setting.

Another aspect of this disclosure is an algorithm for determining the grille opening setting and the engine cooling fan speed to minimize vehicle power consumption.

A further aspect of this disclosure is to provide a deceleration cooling mode by opening the grille to the maximum extent when a vehicle decelerates to increase cooling and increase aerodynamic drag. Increased aerodynamic drag facilitates vehicle deceleration.

DETAILED DESCRIPTION

Detailed embodiments are disclosed that constitute examples of the present invention that may also be embodied in various and alternative forms. The figures are not necessarily to scale and some features may be exaggerated or minimized to show details of particular components. Specific structural and functional details disclosed are not to be interpreted as limiting, but merely as a representative basis for teaching one skilled in the art now to practice the present invention.

Figure 1:
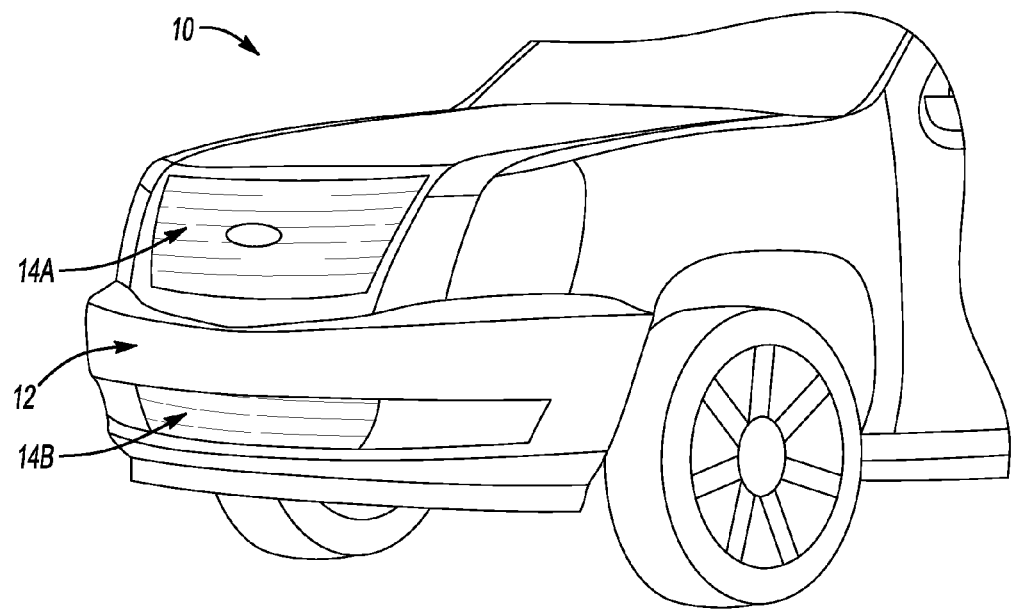
FIG. 1 is a fragmentary front perspective view of a vehicle with two grille openings at the front end of the vehicle.
Figure 2:
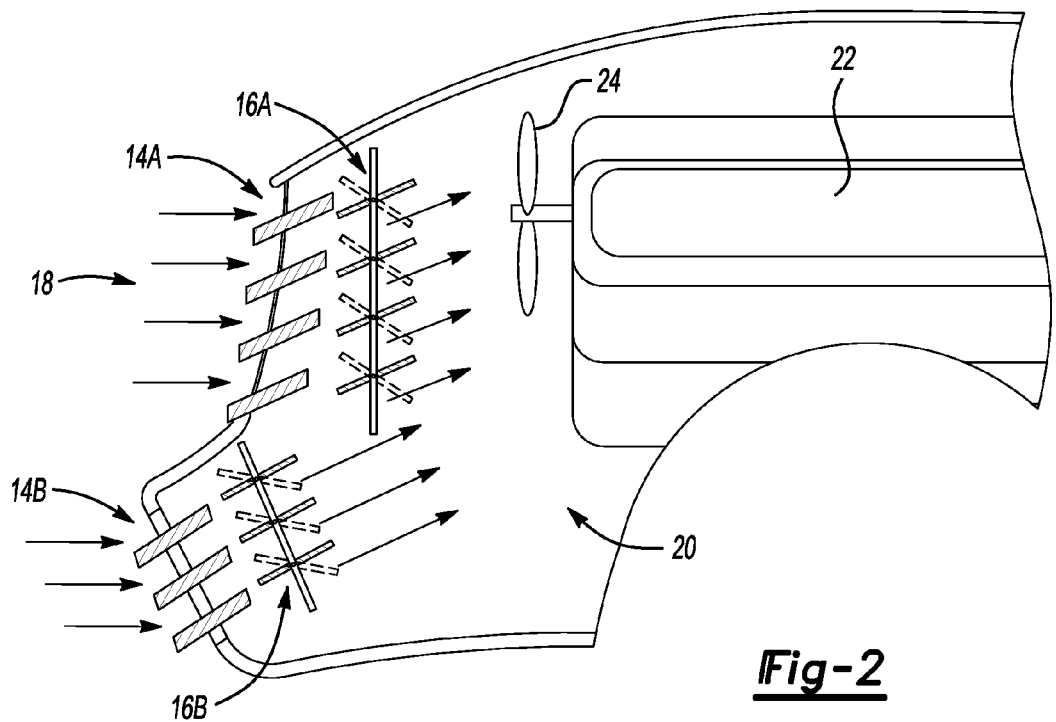
FIG. 2 is a diagrammatic cross-section view of the front end of vehicle showing air passing through the grille opening to the engine compartment in conjunction with a cooling fan that draws air into the engine compartment.

FIG. 1 shows a vehicle 10 having a front end 12, with at least one grille opening 14A and 14B. FIG. 2 shows a cross-section of the vehicle 10 front end with an upper grille opening 14A and a lower grille opening 14B. Ambient air 18, indicated by arrows, is allowed to enter the engine compartment 20 through the grille openings 14A and 14B as the vehicle is driven. The opening areas of the upper grille opening 14A and lower grille opening 14B may be varied by adjusting a number of movable vanes within upper and lower vane systems 16A and 16B. Either a one or two grille opening configuration may be employed. An engine cooling fan 24 may also be employed to actively pull ambient air 18 through the grille openings, 14A and 14B, and from other areas into the engine compartment 20. The adjustable vane systems 16A and 16B operate in conjunction with the powered engine cooling fan 24 to provide required air cooling to components of engine 22. The control of the grille openings is important to efficient engine operation and optimal cooling.

Figure 3:
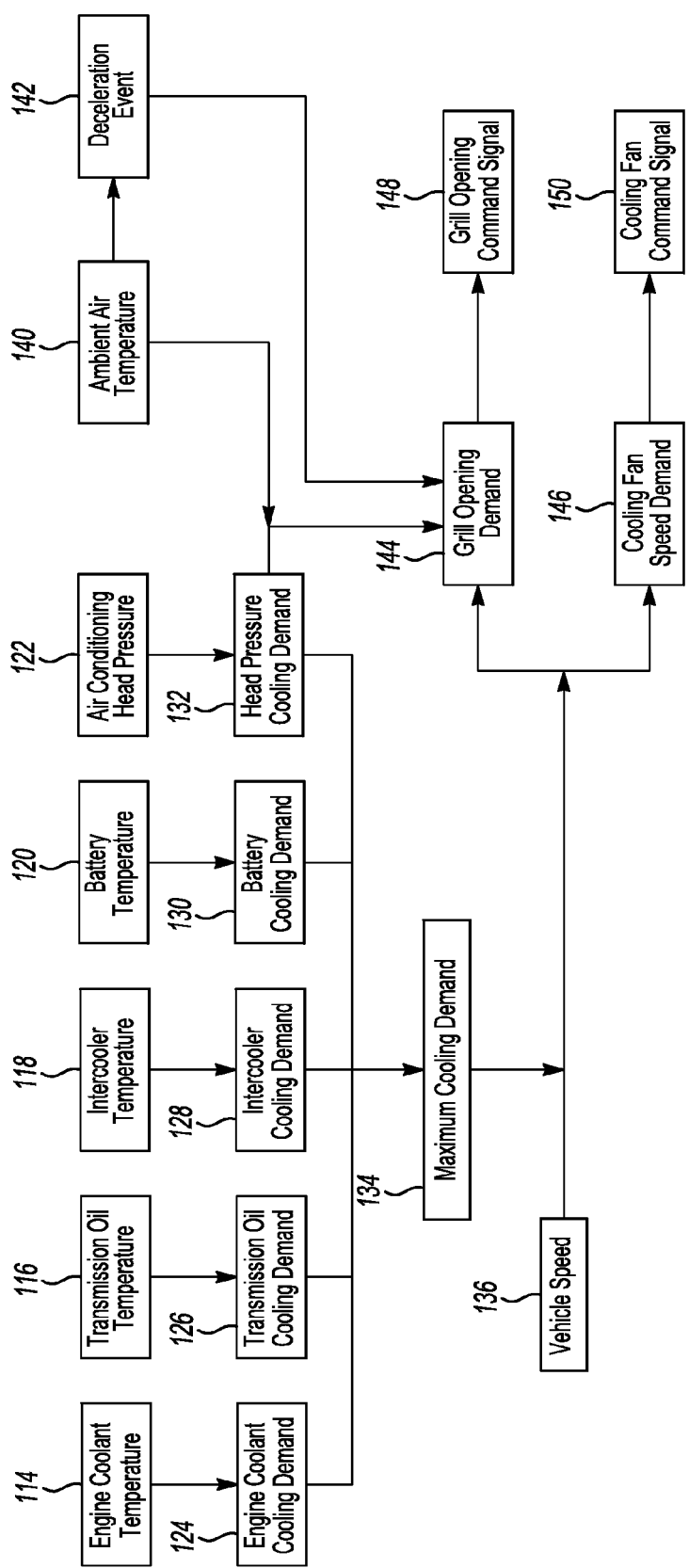
FIG. 3 is a flowchart that illustrates a method of controlling engine cooling fan speed and extent of grille opening utilizing a plurality of vehicle inputs.

FIG. 3 is a flow chart illustrating one example of a method of controlling the amount of grille open area and cooling fan speed. A cooling demand value is calculated for each of a plurality of components requiring cooling. One set of vehicle components, for example, may include engine coolant, transmission, intercooler, battery, and air conditioner. Each component is monitored through a related component operating condition. Component operating condition values for the exemplary set of components may include, for example, engine coolant temperature 114, transmission oil temperature 116, intercooler temperature 118, battery temperature 120, and air conditioning head pressure 122. Each component operating condition value is measured, and provided to a vehicle computing unit or controller. The vehicle computing unit converts each operating condition into a component cooling demand value. An exemplary set of cooling demand values may include engine coolant cooling demand 124, transmission oil cooling demand 126, intercooler cooling demand 128, battery cooling demand 130, and air conditioning head pressure cooling demand 132.

The cooling demand values may be expressed as percentages. At zero percent cooling demand, a given component would require no additional cooling. At 100 percent cooling demand, a given component would require maximum available cooling. The vehicle computing unit or controller selects the highest component cooling demand to establish a maximum cooling demand 134 required for optimal engine operation.

The engine cooling fan speed demand 146 and grille opening demand 144 may be predetermined and recalled by the computing unit or controller for different combinations of maximum cooling demand values 134 and vehicle speeds 136. Alternatively, active calculations may be performed by the computing unit or controller to determine desired settings based on various combinations of vehicle operating conditions. The vehicle computing unit or controller sends signals corresponding to a grille opening command 148 to adjust one or both vane systems to a desired setting, and a cooling fan speed command 150 to adjust the engine cooling fan to a desired speed.

Also shown in FIG. 3 is an exemplary method that uses a deceleration event 142 as a direct input to the grille opening demand 144. Vehicle deceleration events do not require optimal aerodynamic drag and may be used to trigger a maximum grille opening command signal 148. Application of vehicle brakes or a sensed deceleration value may be used as additional vehicle operation inputs for controlling grille opening.

There are several advantages to using deceleration events 142 for controlling grille opening. First, deceleration events occur when it is desirable to reduce vehicle speed that can be aided by increased aerodynamic drag. Secondly, additional engine cooling through grille openings may be provided during deceleration at no expense to fuel efficiency. Thirdly, increasing the grille opening during deceleration events allows components of the engine to be cooled below the maximum cooling demand 134 that is referred to as being pre-cooled. Pre-cooling reduces the need to increase the degree of grille opening after a deceleration event 142. Pre-cooling may also reduce the need to increase engine cooling fan speeds after deceleration. As a result, pre-cooling during deceleration events may allow longer closed grille conditions, and/or reduced grille openings. Under most conditions, a closed or reduced grille opening results in reduced aerodynamic drag. However, there are conditions where it is desirable to disable deceleration cooling. For example, at very low temperatures while the vehicle is at rest, a closed grille opening may assist in faster engine warming. Also at cold temperatures, there may not be a need for increased air cooling to engine components during active driving. Thresholds for ambient air temperature 140 may be used to determine whether deceleration event cooling 142 is disabled.

FIG. 3 also discloses a method for allowing air conditioning head pressure cooling demand 132 to directly influence grille opening demand 144. Air conditioning systems operate more frequently than there is a significant demand for engine component cooling. Air conditioner performance is sensitive to the amount of air flowing across the heat exchanger. A further aspect of the disclosed embodiment is to improve air conditioner performance by allowing air conditioning head pressure demand 132 to increase grille opening demand 144 under certain vehicle speeds and ambient temperatures.

Figure 4:
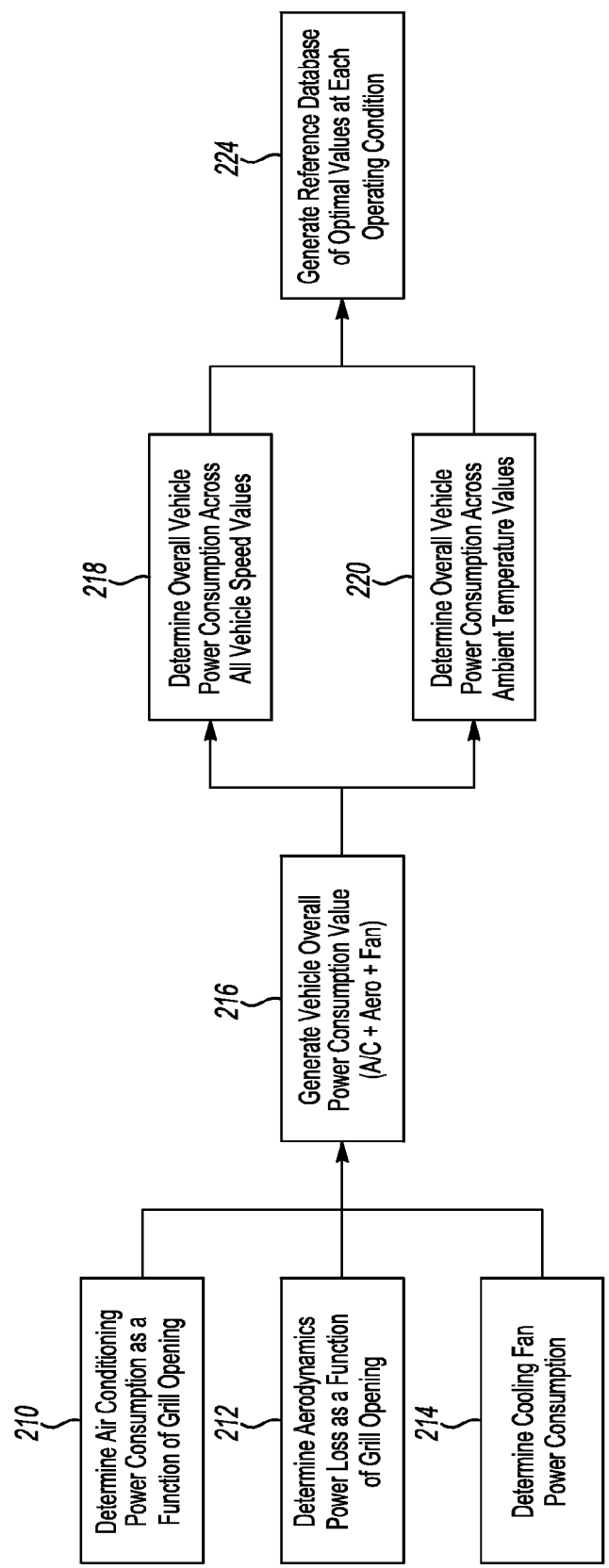
FIG. 4 is a flowchart that illustrates a method of determining engine cooling fan and grille opening settings to minimize combined vehicle power consumption.

FIG. 4 shows a method of determining both a preferred grille opening and a preferred engine cooling fan speed by considering the sum of power consumption related to vehicle cooling, climate control, and aerodynamic effects. Settings for optimal system performance may be obtained through vehicle testing and stored in a "look-up table" in the vehicle computing unit. Alternatively, the sum of power consumption, or an approximation, may be calculated.

A method for determining optimal air intake settings is also disclosed. Vehicle fuel efficiency is adversely affected by the power consumed by the engine cooling fan, power lost through aerodynamic drag, and air conditioning power consumption. The method balances closing the grille opening to reduce aerodynamic drag, and increasing air flow through the grille opening to increase cooling fan and air conditioning efficiency. Air intake system settings are selected to minimize overall power consumption.

In FIG. 4, step 210 includes developing a relationship between air conditioning power consumption and the degree of opening of the grille. Step 212 includes developing a relationship between aerodynamic drag power loss and degree of opening of the grille. Step 214 includes developing a relationship between engine cooling fan speed and degree of opening of the grille. Through vehicle development, a characteristic curve may be developed for each of steps 210, 212, and 214 for a range of vehicle speeds and ambient temperatures. At each given vehicle speed and ambient temperature, step 216 includes a summation of the three noted power consumption curves to provide an overall vehicle power consumption curve as a function of grille opening. Steps 218 and 220 include deriving the overall vehicle power consumption curve for a range of combinations of vehicle speeds and ambient temperatures. This calibration step may yield different signature curves for each vehicle model related to differences in engines, air conditioning hardware, and vehicle shapes. The preferred grille opening settings and preferred engine cooling fan speeds for expected vehicle operating conditions may be stored in a reference database, or look-up table, to be retrieved by the vehicle computing unit, or controller. The curves described in FIG. 4 indicate that a certain setting of the grille opening corresponds with a minimum point on the overall vehicle power consumption curve.

FIGS. 5-8 describe several examples of component power consumption curves, and the summation overall vehicle power consumption curve.

Figure 5:
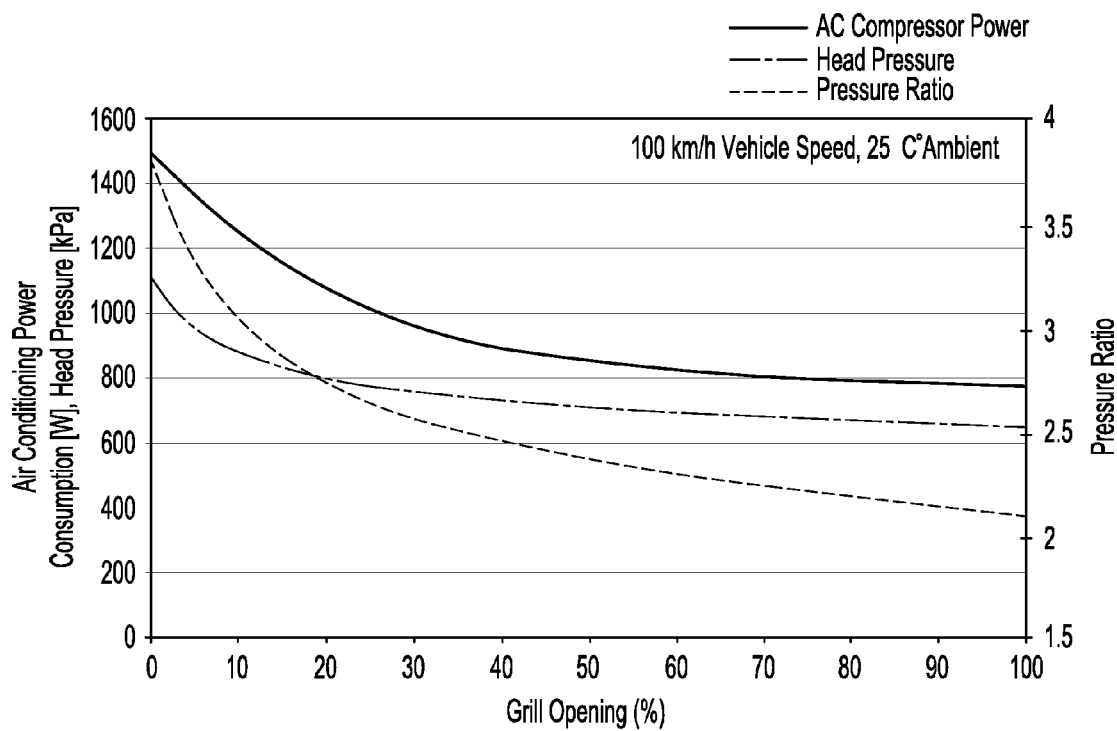
FIG. 5 is a graph of an air conditioner power consumption curve as a function of the extent of grille opening.

FIG. 5 shows an exemplary air conditioning power consumption curve as a function of the grille opening for a given vehicle speed and ambient temperature. The measured head pressure of the air conditioner compressor relates to air conditioning power consumption. Air conditioning power consumption decreases as the grille opening increases. Vehicle air conditioning performance is affected by the volume of air flowing into the engine compartment. Air conditioner power consumption depends on condenser air flow that is related to the volume of air flowing through the grille opening. Retained heat near the engine can increase the load on the air conditioning unit when providing cool air to the passenger compartment. Ambient air taken in to the engine compartment can dissipate heat. Heat dissipation increases the efficiency of the air conditioning unit, and reduces the power consumed.

Figure 6:
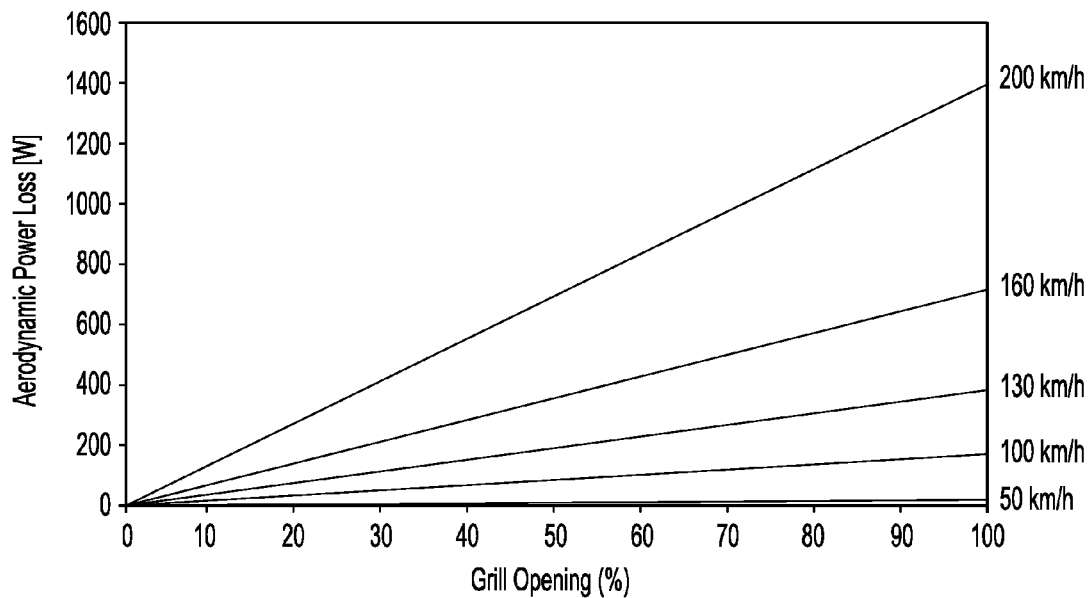
FIG. 6 is a graph of a power loss from aerodynamic drag as a function of the extent of grille opening.

FIG. 6 shows an exemplary aerodynamic drag power loss curve as a function of grille opening for several vehicle speeds. The power loss related to aerodynamic drag increases as the grille opening increases. As more air is allowed into the engine compartment, more air is caught by the engine cavity increasing the coefficient of drag. At higher vehicle speeds the aerodynamic power loss curve is steeper, and the coefficient of drag is more sensitive to the opening area of the grille. At larger grille openings, the engine is required to work harder to propel the vehicle against increased drag, thereby increasing power consumption related to aerodynamic loss.

Figure 7:
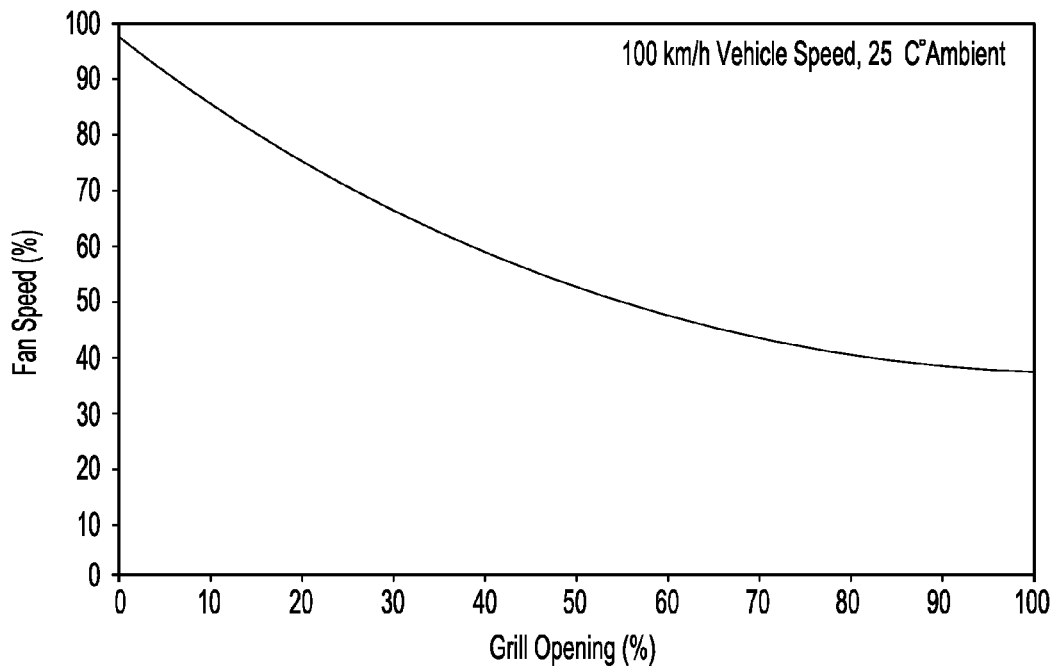
FIG. 7 is a graph of an engine cooling fan power consumption curve as a function of the extent of grille opening.

FIG. 7 shows and exemplary curve of engine cooling fan speed as a function of grille opening at a given vehicle speed and ambient temperature. Less ambient air is allowed through the grille opening as the grille is closed. Increased engine component cooling demands make it advantageous to increase the engine cooling fan speed and may pull air from areas other than through the grille. Increasing engine cooling fan speed increases power consumption. Generally, engine cooling fan power consumption decreases as the degree of grille opening increases for the same degree of cooling.

Figure 8:
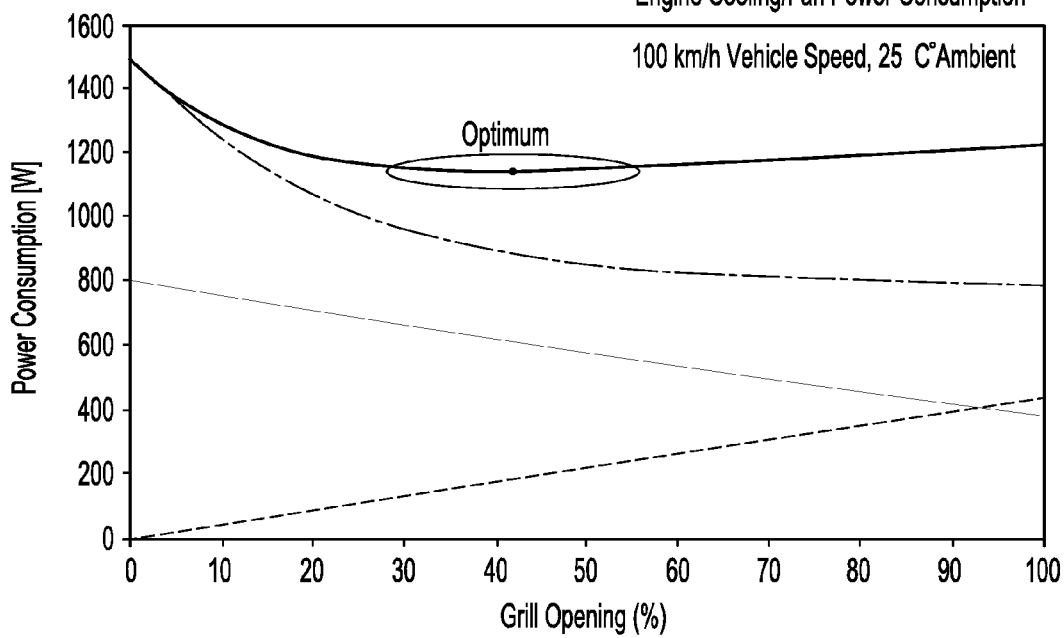
FIG. 8 is a graph of a combined vehicle power consumption related to aerodynamic loss, engine cooling, and air conditioning.

FIG. 8 shows an exemplary overall vehicle power consumption curve as a function of the degree of grille opening. At least the three power consumption values, as discussed above, that relate to climate control, aerodynamic effects, and engine fan cooling may be summed to derive an overall vehicle power consumption curve. The character of the three noted addend curves is relevant to the shape of the sum curve. Both the air conditioning power consumption curve, as shown in FIG. 5, and the engine cooling fan power consumption curve, as shown in FIG. 6, exhibit a decreasing slope as grille opening increases. The aerodynamic power loss curve, as shown in FIG. 7, exhibits an increasing slope as grille opening increases. These opposing slopes provide a summation curve that is concave up, with a minimum point. The grille opening setting that corresponds to the minimum power consumption is considered the preferred grille opening setting for a given vehicle speed and ambient temperature. The preferred grille opening setting may be determined through vehicle development and system calibration testing for expected vehicle operating combinations.

Tables containing preferred settings for both the degree of grille opening and engine cooling fan speed may be stored in a look-up table on the vehicle computing unit or controller. One particular advantage of using a lookup table is that overriding events may be programmed into the system, as necessary. For example, the controller may be programmed to automatically generate a full open grille command signal at desired deceleration conditions. Another example of an overriding event is when the car is at idle above a desired ambient temperature threshold, the controller may be programmed to generate a full open grille command signal. A further example of a desirable overriding condition is a cold start warm up. At cold temperatures, maintaining a fully closed grille helps to retain engine heat, and shortens the duration of time required for the engine to warm upon an initial start. The use of overriding events in conjunction with a power consumption minimization strategy provides flexibility and improved vehicle performance.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various embodiments may be combined to form further embodiments of the invention.

What is claimed is:

1. A method of controlling a vehicle air intake system having an adjustable grille and an adjustable engine cooling fan comprising:
    sensing a plurality of vehicle operating values;
    determining a preferred grille opening setting and a preferred engine cooling fan speed, as a function of the plurality of vehicle operating values, wherein a vehicle deceleration signal is used to modify the preferred grille opening setting to a generally full open position;
    adjusting the grille to the preferred grille opening setting; and
    adjusting the engine cooling fan to the preferred engine cooling fan speed.

2. The method according to claim 1, wherein the plurality of vehicle operating values may include a combination of a vehicle speed value, an ambient temperature value, a vehicle deceleration signal, and a plurality of component cooling demand values.

3. The method according to claim 1, wherein each of the plurality of vehicle operating values is a component cooling demand value that corresponds to one of a plurality of engine components.

4. The method according to claim 3, wherein at least one of the plurality of component cooling demand values comprises an air conditioning head pressure cooling demand value that may be determined from air conditioning compressor head pressure.

5. The method according to claim 3, wherein at least one of the plurality of component cooling demand values comprises an engine coolant cooling demand value that may be determined from engine coolant temperature.

6. The method according to claim 3, wherein at least one of the plurality of component cooling demand values comprises a transmission oil cooling demand value that may be determined from transmission oil temperature.

7. The method according to claim 3, wherein at least one of the plurality of component cooling demand values comprises an intercooler cooling demand value that may be determined from intercooler temperature.

8. The method according to claim 3, wherein at least one of the plurality of component cooling demand values comprises a battery cooling demand value that may be determined from battery temperature.

9. The method according to claim 3, wherein a maximum cooling demand value is determined by selecting one of the plurality of component cooling demand values that is greatest.

10. The method according to claim 9, wherein at least the maximum cooling demand value is used to determine the preferred grille opening setting and the preferred engine fan speed.

11. The method according to claim 3, wherein the air conditioning head pressure cooling demand value is used directly to override the preferred grille opening setting.

12. A method of controlling an adjustable grille and an engine cooling fan speed by simultaneously considering a multitude of vehicle inputs to reduce overall vehicle power consumption, the method comprising:
    sensing a plurality of component values corresponding to engine components that may include one or more of an engine coolant temperature, a transmission oil temperature, a battery temperature, and an air conditioner compressor head pressure;
    calculating a plurality of component cooling demand values corresponding to the plurality of component values;
    selecting a maximum cooling demand value from the plurality of component cooling demand values;
    calculating a vehicle power consumption value that may be comprised of the sum of an air conditioner power consumption value, an aerodynamic drag power loss value, and an engine cooling fan power consumption value;
    selecting a preferred grille opening setting and a preferred engine cooling fan speed as a function of the maximum cooling demand value that minimizes the vehicle power consumption value;
    adjusting the adjustable grille to the preferred grille opening setting and setting the preferred grille opening to a full open setting when a vehicle brake is applied; and
    adjusting the engine cooling fan speed to the preferred engine cooling fan speed.

* * * * *